(12) United States Patent
Blankenship et al.

(10) Patent No.: US 7,357,290 B2
(45) Date of Patent: *Apr. 15, 2008

(54) WORKPIECE SUPPORT STRUCTURES AND SYSTEM FOR CONTROLLING SAME

(75) Inventors: George D. Blankenship, Chardon, OH (US); Christopher Hsu, Mentor, OH (US); Jeffrey R. Klein, Mentor, OH (US)

(73) Assignee: Lincoln Global, Inc., City of Industry, CA (US)

( * ) Notice: Subject to any disclaimer, the term of this patent is extended or adjusted under 35 U.S.C. 154(b) by 323 days.

This patent is subject to a terminal disclaimer.

(21) Appl. No.: 10/857,293

(22) Filed: May 28, 2004

(65) Prior Publication Data

US 2005/0045691 A1 Mar. 3, 2005

Related U.S. Application Data

(60) Provisional application No. 60/497,867, filed on Aug. 26, 2003.

(51) Int. Cl.
*B23K 37/04* (2006.01)
(52) U.S. Cl. .................. 228/49.1; 228/102; 248/178.1
(58) Field of Classification Search .............. 228/8, 228/49.1, 102; 219/161, 158; 269/289 R, 269/31, 42, 24, 4; 248/55, 555, 594, 598, 248/596, 649, 654, 677, 678, 424, 163.1, 248/431, 163.2, 168, 169, 170, 171, 178.1, 248/179.1, 180.1, 181.1, 177.1, 439
See application file for complete search history.

(56) References Cited

U.S. PATENT DOCUMENTS 3,971,537 A 7/1976 Winkle et al.

(Continued)

FOREIGN PATENT DOCUMENTS

FR WO 0249799 * 6/2002

OTHER PUBLICATIONS (Design of Experiment, An Overview and Application Example, Medical devicelink , Kim et al., MDDI archive Mar. 1999).*

(Continued)

*Primary Examiner*—Jonathan Johnson
*Assistant Examiner*—Michael Aboagye
(74) *Attorney, Agent, or Firm*—Fay Sharpe LLP

(57) ABSTRACT

In accordance with one aspect of the present exemplary embodiment, set forth is a welding system including a plurality of adjustable welding support structures positioned in relationship to each other to permit welding of a workpiece held by a plurality of adjustable welding support structures, each of the support structures having a movable platform. The control system individually controls the position of the movable platform for each of the adjustable welding structures.

In another embodiment of the present application, provided is a method for increasing the accuracy at which an adjustable support structure control system positions at least one adjustable support structure. Included in the process is the generation of a model of the adjustable support structure having an initial set of parameters, including structural position parameters and corresponding control element position parameters. A Design Of Experiments process is performed using the adjustable support structure control system to obtain actual structural position parameters and control element position parameters. The parameters of the adjustable model support structure are updated based on the results of the results of the Design Of Experiments, and a compensation mechanism is updated based on the updated parameters of the model support structure, wherein the compensation mechanism is used by the control system to increase the accuracy of positioning of the at least one adjustable support structure.

29 Claims, 12 Drawing Sheets

U.S. PATENT DOCUMENTS

| | | | | | |
|---|---|---|---|---|---|
| 4,418,860 | A | * | 12/1983 | LaForce | 228/196 |
| 4,854,028 | A | | 8/1989 | Büchler et al. | |
| 4,970,773 | A | | 11/1990 | Büchler et al. | |
| 5,027,713 | A | | 7/1991 | Kindmann et al. | |
| 5,050,844 | A | * | 9/1991 | Hawk | 254/89 H |
| 5,163,659 | A | * | 11/1992 | Lizell | 267/64.16 |
| 5,253,331 | A | | 10/1993 | Lorenzen et al. | |
| 5,597,359 | A | * | 1/1997 | Byerly | 472/60 |
| 5,628,252 | A | | 5/1997 | Kuznetsov | |
| 5,649,489 | A | | 7/1997 | Powell et al. | |
| 5,772,192 | A | * | 6/1998 | Hoffmann | 269/37 |
| 5,947,740 | A | * | 9/1999 | Kim | 434/29 |
| 6,029,950 | A | * | 2/2000 | Yeh | 254/126 |
| 6,453,544 | B2 | | 9/2002 | Cioletti et al. | |
| 6,489,593 | B2 | * | 12/2002 | Bossotto | 219/159 |
| 6,564,516 | B1 | | 5/2003 | Svensson | |
| 6,627,841 | B2 | | 9/2003 | Chen et al. | |
| 6,671,572 | B1 | | 12/2003 | Craft et al. | |
| 6,695,289 | B1 | * | 2/2004 | Mickael | 254/122 |
| 6,868,567 | B2 | * | 3/2005 | Edgerton | 5/611 |
| 7,000,927 | B2 | * | 2/2006 | Bell | 280/6.153 |
| 7,011,244 | B2 | * | 3/2006 | Baylot | 228/114 |
| 2001/0029654 | A1 | | 10/2001 | Cioletti et al. | |
| 2002/0111225 | A1 | * | 8/2002 | Sobol | 473/278 |
| 2005/0045690 | A1 | * | 3/2005 | Blankenship et al. | 228/49.1 |

OTHER PUBLICATIONS

Murphy, Shaun, *Not All Design Methodologies Are Created Equal*, IronCAD, LLC, Nov. 2003, pp. 1-14.

Kim, John S. et al., *Design of Experiments: An Overview and Application Example*, Canon Communications LLC 2002, MDDI Archive, originally published Mar. 1996, www.devicelink.com/mddi/archive/96/03/011.html, pp. 1-6.

*Solid edge Design and Drafting*, EDS Solid Edge PLM Solutions, Copyright © 2003 Electronic Data Systems Corporation, Nov. 2003, 2 pgs.; including *Highlights of Solid Edge Version 15*, pp. 1-5.

*What is Design of Experiments*, article from Control Engineering, Jan. 1999, Designing for Sig Sigma Capability, Parts 1, 2; last modified Oct. 19, 2003, © Copyright C.F. Kavanaugh & Associates 1996-2002 (3 pgs.), http://carol.kavanaugh.com/doewhat.html; including *What is Design of Experiments and Why and Where is it Useful?*, Methods & Technology—DOE (2 pgs.), http://www.umetrics.com/methodtech_doe.asp; including *Response Surface Designs*, The MathWorks, Inc. © 1994-2004 (1 pg.) http://www.mathworks.com/access/helpdesk/help/toolbox/stats/doe5.shtml.

*Why Adaptive Technology Is Superior to Parametric-Only Systems*, © Copyright 2001 Autodesk, Inc., pp. 1-7, www.autodesk.com/inventor.

*Why Use Design of Experiments?*, JMP Statistical Discovery Software, Copyright 2004 SAS Institute Inc., Cary, NC, pp. 1-2, http://www.jmp.com/product/design_of_experiments/good-design.shtml.

*Model-Based Calibration Toolbox 1, for the calibration of complex powertrain systems*, © 2001 by The MathWorks, Inc. 9984v00 Dec. 2001, 4 pgs., www.mathworks.com.

* cited by examiner

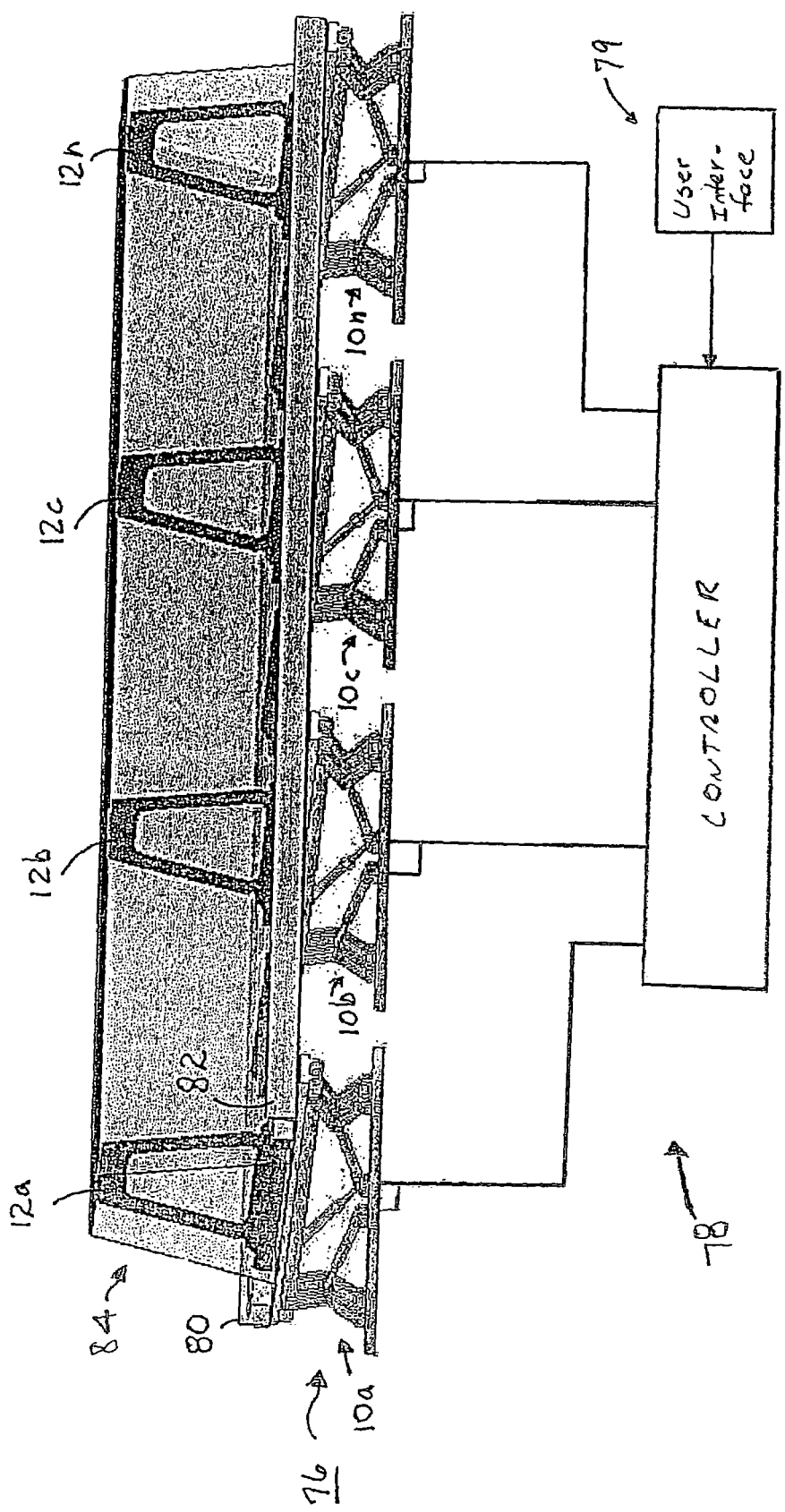

WORKPIECE SUPPORT STRUCTURES AND SYSTEM FOR CONTROLLING SAME

RELATED CASES

Applicants claim priority to U.S. Provisional Application No. 60/497,867, filed Aug. 26, 2003, and hereby incorporate that application by reference herein.

BACKGROUND

The present application is directed to support structures, and more particularly to adjustable support structures and arrays of such structures which permit the positioning of workpieces to be welded or otherwise machined in desired configurations.

Freeform structural shapes are increasingly required in applications such as bridges, walkways, stairways, monorails, train tracks, among other uses. These shapes must be precisely fixtured prior to fabrication steps such as welding or machining. If only one unique shape is required, it is usually practical to build a unique support structure specifically for the part using temporary construction methods. If many copies of a unique shape are required, or if only one feature of the complex shape is changing, a dedicated support structure may be produced. However, designers are increasingly specifying arbitrary unique curvilinear shapes for use in applications such as rail tracks, bridges with curvature, and prefabricated walkways for complex building designs, among others. In these situations, the cost of preparing support structures for each arbitrary shape often exceeds the cost to produce the shapes.

A particular area to which the present application finds usefulness is with magnetically levitated rail systems which are now under consideration for use between major cities and along interstate highways. To support the trains, a massive rail system comprising sections of welded tracks extending as much as 200 feet or more are intended to be used. Each of these welded sections is assembled on support structures and then welded, preferably automatically by robotic equipment. The challenge of this project is the use of support structures for the elongated tracks, which are in the form of box shaped weldments weighing many tons. To allow the levitated trains riding on the track sections to bank, curve, incline upwardly and incline downwardly, track sections having such profiles are required. Consequently, various track sections of a rail system will be unique and must, therefore, be individually supported to reflect a desired track profile before being welded.

BRIEF DESCRIPTION

In accordance with one aspect of the present exemplary embodiment, set forth is a welding system including a plurality of adjustable welding support structures positioned in relationship to each other to permit welding of a workpiece held by a plurality of adjustable welding support structures, each of the support structures having a movable platform. The control system individually controls the position of the movable platform for each of the adjustable welding structures.

In another embodiment of the present application, provided is a method for increasing the accuracy at which an adjustable support structure control system positions at least one adjustable support structure. Included in the process is the generation of a model of the adjustable support structure having an initial set of parameters, including structural position parameters and corresponding control element position parameters. A Design Of Experiments process is performed using the adjustable support structure control system to obtain actual structural position parameters and control element position parameters. The parameters of the adjustable model support structure are updated based on the results of the results of the Design Of Experiments, and a compensation mechanism is updated based on the updated parameters of the model support structure, wherein the compensation mechanism is used by the control system to increase the accuracy of positioning of the at least one adjustable support structure.

BRIEF DESCRIPTION OF THE DRAWINGS

FIG. 3 sets out a linear array of support structures controlled by a control system in accordance with the present application;

DETAILED DESCRIPTION

The present application is directed to adjustable support structures which permit refined positioning of workpieces, such as weldments and/or rails. In the following, the use of the term support structures will include the concept of a welding fixture used to hold weldments. In one embodiment, a number of adjustable support structures may be spaced to hold weldments and rails which are to be incorporated into a magnetically levitated rail system. The support structures are independently adjustable to permit the elongated weldments forming the rail section to first be contoured to match the desired track shape or profile, prior to welding. The adjusting operation may occur prior to the weldments being positioned on the adjustable support structures as well as after they are so positioned.

Figure 1:
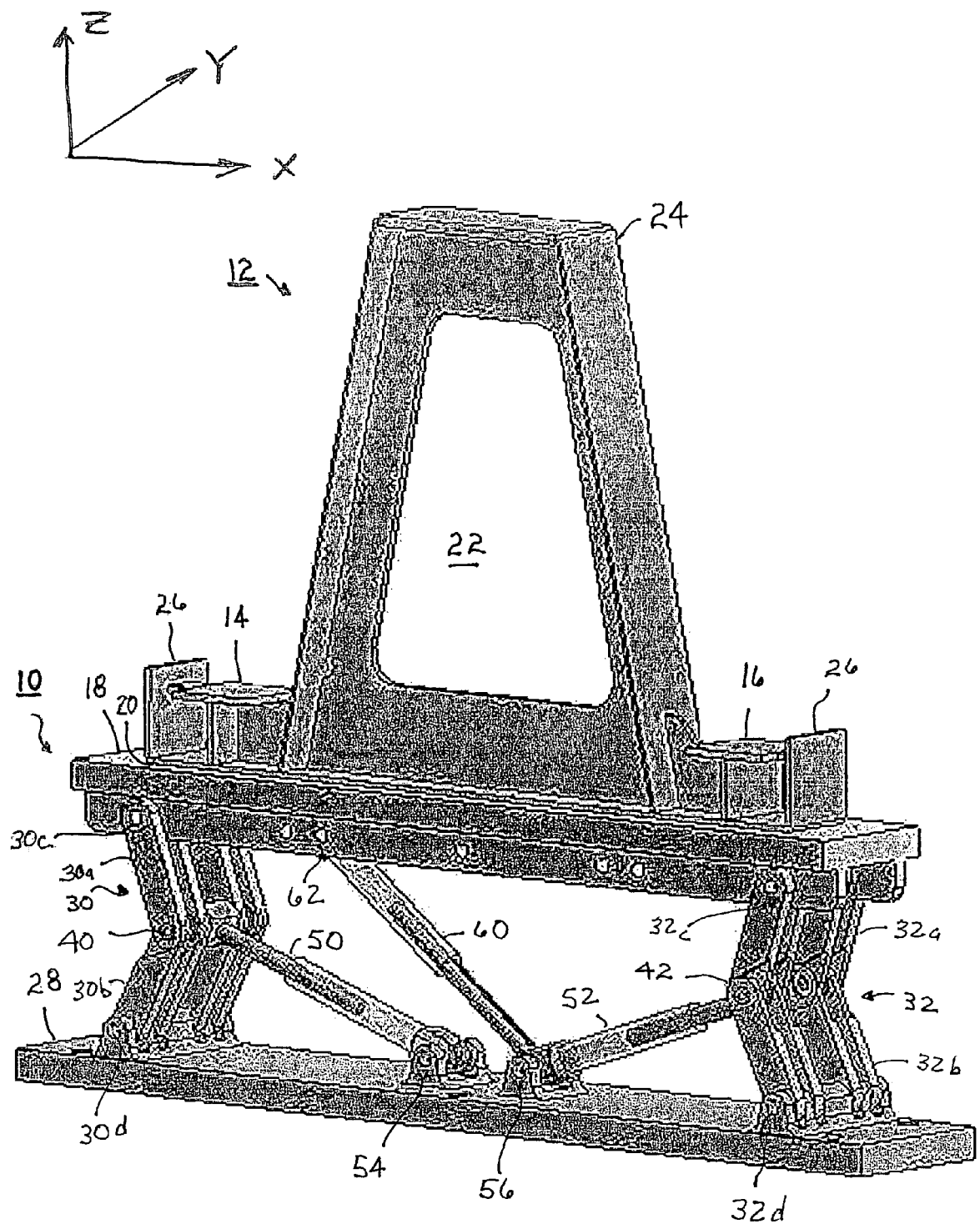
FIG. 1 is a rotated view of a support structure according to the present application, holding a weldment for welding.

Turning to FIG. 1, illustrated is a single adjustable support structure 10, in accordance with the present application. Support structure 10 is depicted holding a weldment 12, having spaced rails 14, 16. Support structure 10 includes an upper movable platform 18, on which is held a top surface 20 of weldment 12. Movable platform 18 is adjusted to a desired position or orientation, for a particular area of the track section weldment 12 will be located. The weldment is boxed around frame 22 by elongated strips 24 (only short pieces of which are shown in FIG. 1). Top surface 20 of weldment 12 is the upper side of the rail section when incorporated into the rail system. Brace structures 26 are at spaced positions along the length of weldment 12. As illustrated in this figure, brace structures 26 are positioned to have rails 14, 16 positioned between the braces 26 and outer portions of frame 22 of weldment 12. With further attention to support structure 10, a lower fixed support base 28 is in operable connection with movable upper platform 18 through transversely spaced multi-positionable hinges 30, 32. In one embodiment, the multi-positionable hinges may be 2-bar linkages, and the following discussion primarily refers to components or elements 30, 32 as 2-bar linkages. It is, however, to be appreciated that other hinge or other appropriate structures which permit appropriate movement of movable platform 18 may be used without departing from the scope and intent of the present invention.

The 2-bar linkages 30, 32 include respective first or upper bar linkages 30a, 32a, and second or bottom bar linkages 30b, 32b, where upper bar linkage 30a is connected to movable upper platform 18 via pintle or pivot element 30c, and upper bar linkage 32a is attached to movable upper platform 18 via pintle or pivot element 32c. Lower bar linkage 30b is connected to fixed support base 28 via pintle or pivot element 30d, and lower bar linkage 32b is connected to fixed support base 28 via pintle or pivot element 32d. The upper and lower linkages of each of the 2-bar linkages are joined together at a center point by pintles or pivot elements 40, 42, respectively.

As mentioned, support structure 10 may be adjusted to locate weldment 12 to an orientation or position appropriate for a desired welding operation. To adjust the position of movable upper platform 18 with respect to fixed support base 28, actuators, such as length adjusting members 50, 52, are connected between pintles 40, 42 and pintle or pivot elements 54 and 56, respectively, positioned generally near the center of fixed base 28. In addition, an actuator, such as length adjusting member 60, is connected between fixed support base 28 via pintle or pivot element 56 and pintle or pivot element 62 to movable platform 18. Positioning of length adjusting members 50, 52 and 60 determine the position of movable platform 18 and therefore the location of weldment 12 being carried thereon. Pivot elements 30c, 32c, 30d, 32d, 40, 42, 54, 56 and 62 provide support structure 10 with 3-degrees of freedom, i.e., having capability of moving in the x and z directions, as well as tilting in the x-z plane. The physical size and operational characteristics of the individual length adjusting members 50, 52, 60 act to determine the envelope of motion for support structure 10. While in a preferred embodiment, the length adjusting members are hydraulic actuators, they may also represent other actuators such as pneumatic or ball-and-screw actuators.

It is to be appreciated that support structure 10 is designed to hold workpieces such as would be imposed by weldment 12. Loads of this type place large loading forces on the components of support structure 10. The precision and useful life of length adjusting members 50, 52, 60, which in one embodiment are considered to be linear actuators, are diminished when undesirable side forces are applied in a direction other than the axis of motion (i.e., in this case, x, z directions and tilting in the x-z plane). The present design minimizes and/or eliminates side forces applied to the length adjusting members 50, 52, 60, and their associated connections. Particularly, the mechanical linkages, including the linear actuators (i.e., length adjusting members 50, 52 and 60) of structure 10, are fixed on pivoting joints, by the noted pivoting elements to minimize or eliminate side forces, where each length adjusting member is either in compression or tension, depending on the loading forces presented by the workpiece, such as weldment 12.

Figure 2A:
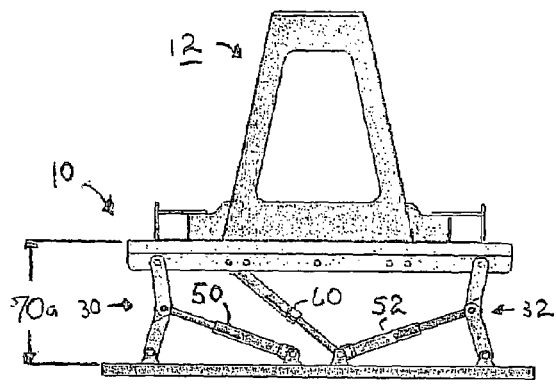
FIGS. 2A-2F depict varying positions to which the support structure of the present application may be positioned.
Figure 2B:
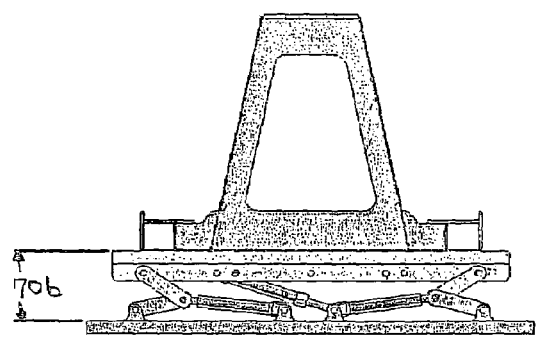
Figure 2C:
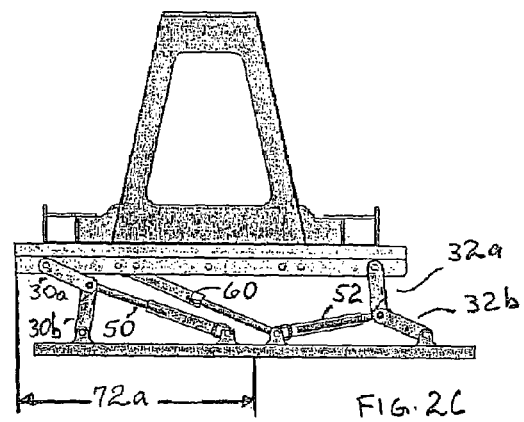
Figure 2D:
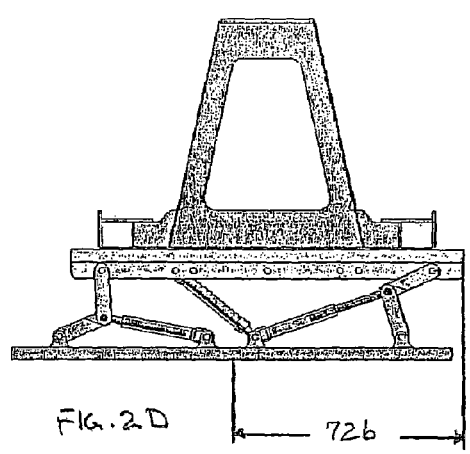
Figure 2E:
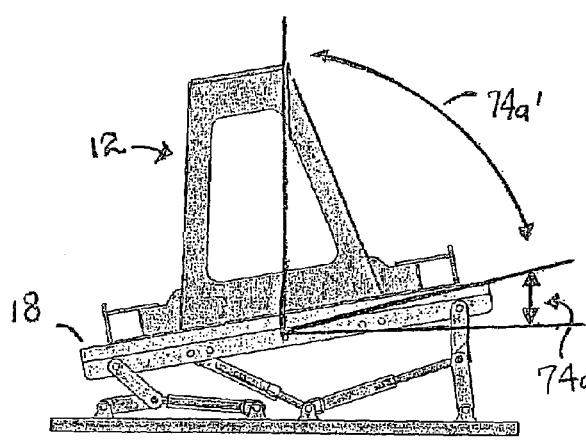
Figure 2F:
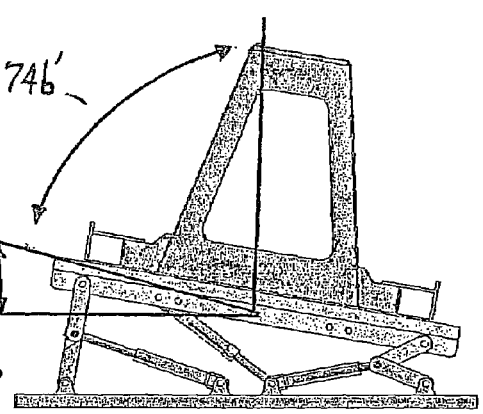

Turning to FIGS. 2A-2F, set forth are examples of the range of motion available in accordance with an embodiment of support structure 10. Particularly, FIGS. 2A-2B show movement in the z-direction, FIGS. 2C and 2D illustrate movement in the x-direction, and FIGS. 2E and 2F depict rotation or tilting around the y axis (in the x-z plane). Each pair of FIGS. 2A-2F illustrate movement from one position in a first plane or axis, (i.e., the z-direction, x-direction or x-z plane) to another position within that respective direction or plane.

Providing 2-bar linkages 30, 32, which are joined together at the center by pintles 40, 42, as well as pivot elements 30c, 32c, 30d, 32d, 54, 56 and 62, permits position adjustment of movable upper platform 18 to be accomplished in a substantially linear fashion. It is to be noted that length adjusting members 50, 52 and 60 are used cooperatively to achieve a desired position of movable upper platform 18.

For example, with attention to FIGS. 2A and 2B, moving support structure 10 from its initial position in FIG. 2A to the position of FIG. 2B, requires length adjustment members 50, 52 and 60 to act in a cooperative fashion, to re-locate movable upper platform 18 from z-plane location 70a in FIG. 2A, to the z-plane location 70b in FIG. 2B. The cooperative action causes angles of the 2-bar linkages 30, 32 to be altered from a large included angle, approximately 170° in FIG. 2A, to a smaller included angle, approximately 25° as in FIG. 2B. The smaller angles are obtained by a closing scissoring action of 2-bar linkages 30, 32 resulting from contraction of length adjusting members 50, 52, 62. While it was noted above that length adjusting members 50, 52 and 60 operate cooperatively, there may or may not be a dominant length adjusting member which has operational characteristics for holding a larger amount of weight than the other members. Additionally, the movement of members 50, 52 and 60 may be accomplished manually or automatically, as will be explained in greater detail below.

Turning to FIGS. 2C and 2D, in FIG. 2C, movable platform 18 is positioned in the x-direction 72a, left of center over the lower fixed support base 28. FIG. 2D shows movable platform 18 shifted to a right-of-center position 72b, as referenced by the lower fixed support base 28. To accomplish this position change, length adjusting members 50 and 60 are actuated to contract to a shorter length, while length adjusting member 52 is extended in length. These actions cause 2-bar linkage 30 to substantially maintain its angle between upper linkage 30a and lower linkage 30b, while pivot elements 30c and 30d permit rotation about their connections, contributing to a shifting of movable platform 18 to the right of fixed support base 28. Similarly, upper linkage 32a and lower linkage 32b of 2-bar linkage 32 also substantially maintain the same angle in both FIGS. 2C and 2D. The pivot elements 32c and 32d permit rotation upon the extension of length adjusting member 52, whereby the movable upper platform 18 is shifted to the right of fixed support base 28.

Turning to FIGS. 2E and 2F, FIG. 2E depicts movable platform 18 tilted in the x-z plane, such that the left-hand side of movable platform 18 is positioned closer to fixed base 28, as compared to the right side of movable platform 18. Positioning of length adjusting members 50, 52 and 60 provides a tilt angle 74a of the movable platform 18, which provides an angle of adjustment 74a' for the weldment 12 as shown in the FIGURE. Turning to FIG. 2F, extension of length adjusting members 50 and 60, along with contraction of length adjusting member 52, causes 2-bar linkage 30 to increase its angle to approximately 180°, and causes the angle of 2-bar linkage 32 to decrease to approximately 45° (FIG. 2F) resulting in rotation of movable upper platform 18 about the y axis in the x-z plane as shown.

The foregoing FIGURES illustrate that support structure 10 has 3-degrees of freedom of movement. The support structure also resists side forces which would otherwise cause lowering the precision and/or lifetime of the length adjusting members by elimination of large side forces applied in a direction other than the axis of motion. Thus, it will be appreciated that the relative values and relationships as shown and described are merely exemplary, and should not be interpreted as limiting the invention.

As set forth in FIG. 3, a series of support structures 10a-10n are arranged as a linear array 76. Each support structure 10a-10n is individually adjustable for a unique x-offset, z-offset and/or x-z tilt angle. By such an array arrangement, an extended structural shape with curvature, changing elevation, changing bank angle or other structural design parameter, may be fixtured for fabrication. For example, in FIG. 3, upper movable platforms 18a, 18b, 18c and 18n of respective support structures 10a, 10b, 10c and 10n are individually positioned by a support structure control system 78, wherein each of the support structures are provided with commanded position parameters from computer aided design program to piecewise fit a desired shape (embodiments of control system 78 will be discussed in more detail in FIGS. 10A and 10B). As shown by user input interface 79, a user may communicate with control system 78 from a remote location to input instructions, monitor operation of the system, etc. These instructions may be provided by a wireline connection, or alternatively, via the Internet or other communication network, as would be known in the art. Of course, the user interface may also be part of control system 78.

By use of this system, design weldments 12a, 12b, 12c and 12n, are positioned in relationship to each other to provide welding of rails 80, 82 at locations wherein the finished product will have an appropriate profile required for a selected track section. In this example, it is noted that support structures 10a-10n are positioned, so the left-hand side of movable upper platforms 18a-18n are at a raised angle as compared to the right-end of upper movable platforms 18a-18n. This is accomplished by positioning the support structures by operation of length adjusting members 50, 52, 60 as described in connection with FIGS. 1-2F. As also previously mentioned, weldments 12a-12n are positioned upside-down from their arrangement when within a rail system.

It may be desirable to flex the structural shape, such as track section 84, in a controlled manner after welding and prior to releasing it from the array to equalize residual stresses. To accomplish this, the array of support structures may be swept through a series of coordinated motions, via control system 78 designed to flex the shape. Areas of residual stress above the yield point of the material will be relieved as the material yields in local areas.

Figure 4:
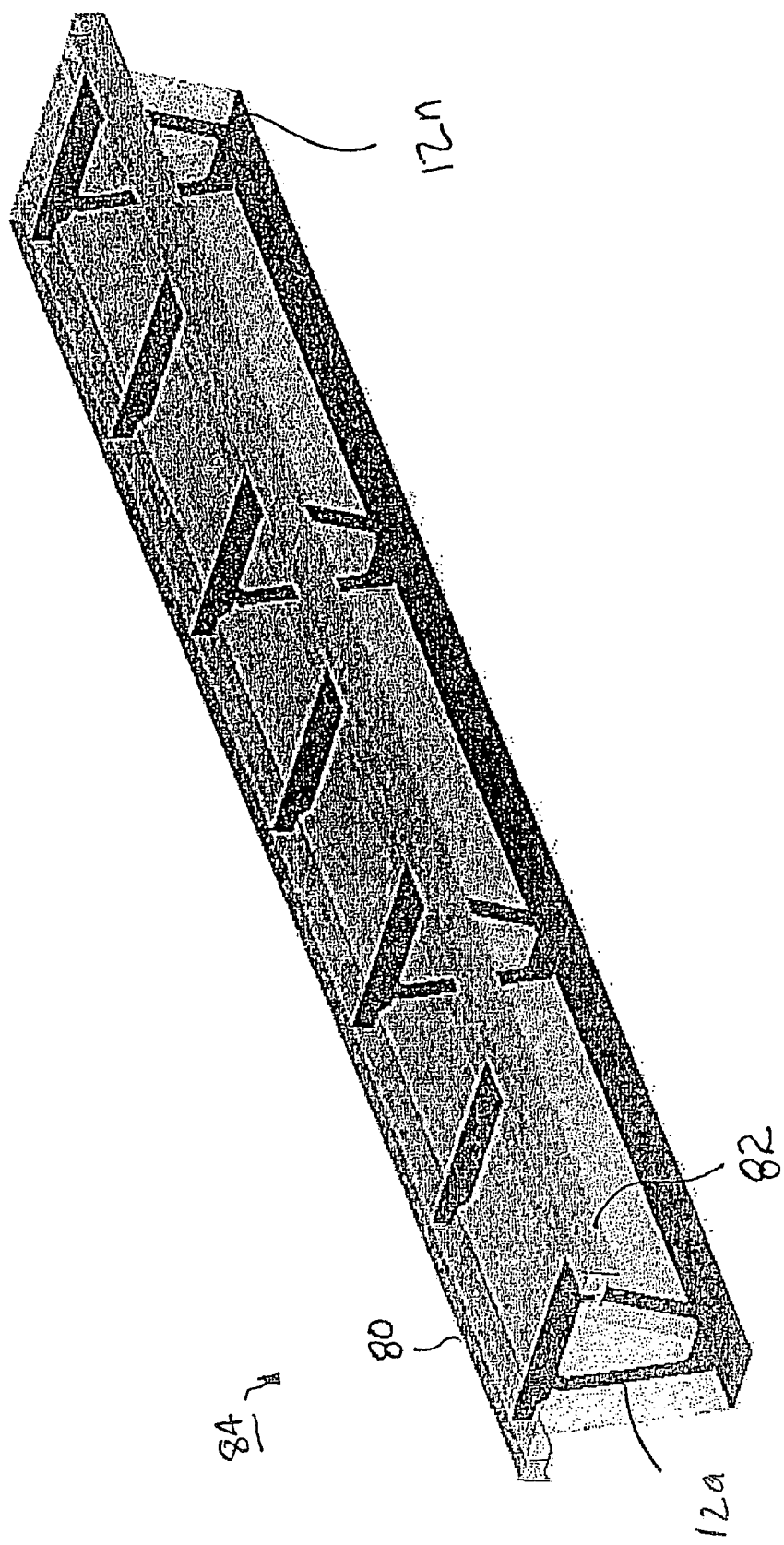
FIG. 4 sets forth a welded track section removed from the support structure.
Figure 5:
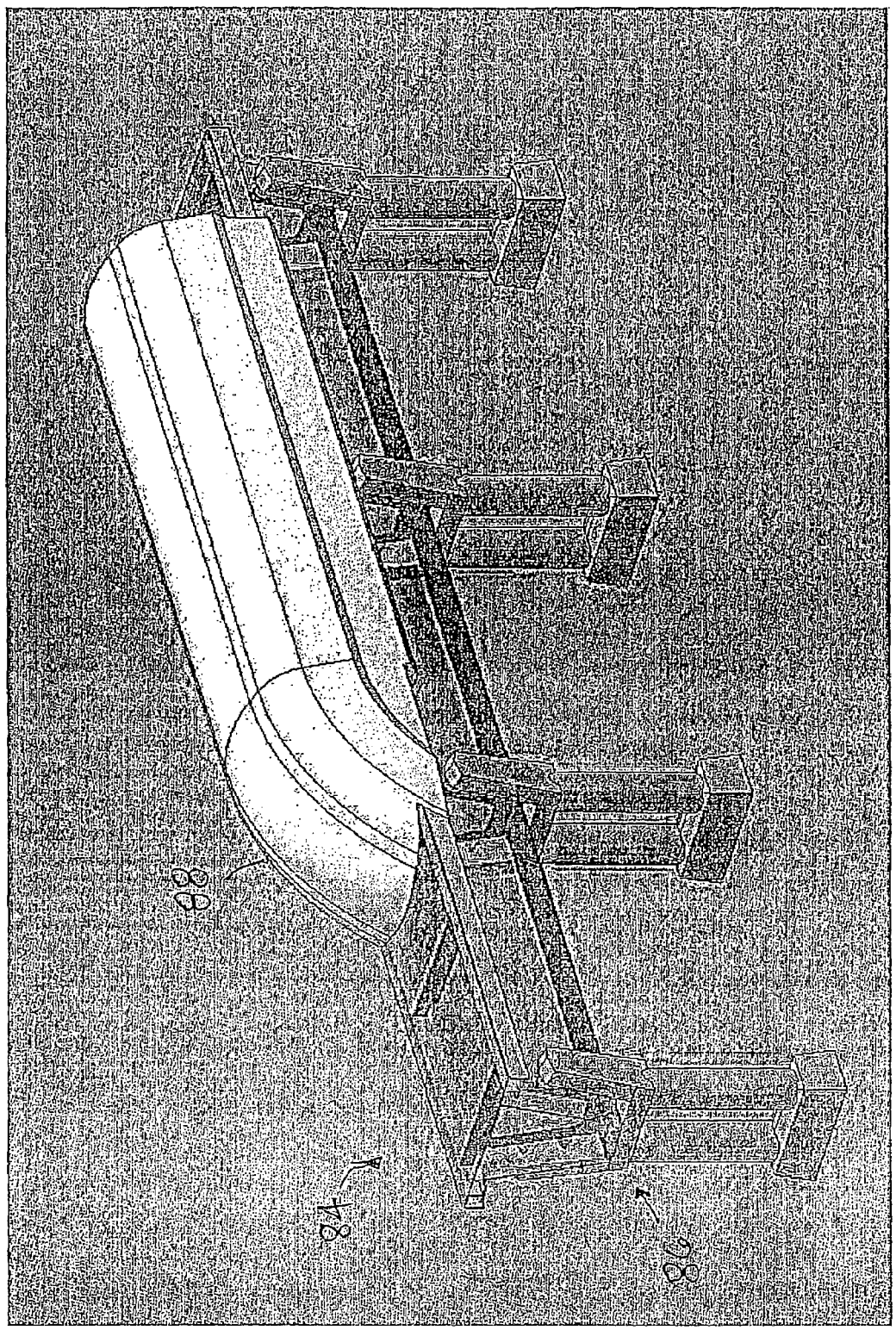
FIG. 5 shows the track structure welded using the fixturing of the support structure array implemented within a train system.

FIG. 4 depicts welded track section 84 having rails 80 and 82 welded to weldments 12a-12n removed from the array of support structures 76. Thus, by using a plurality of spaced-apart support structures arranged, for example, in a linear array with curvature, change in elevation and/or changing bank angle, an elongated structure such as track section 84 may be fixtured and fabricated. FIG. 5 illustrates the constructed track section 84 incorporated within a plurality of rail supports 86 of a rail system upon which a maglev or other train 88 travels.

As mentioned, the linear array of individually adjustable support structures 76 (FIG. 3) permits welding of a desired track profile (i.e., its curvature, incline, decline, bank, etc.). It is possible to attempt an analytical solution for the resultant position of the support structures based on the position of each length adjusting member 50, 52 and 60. A closed-form mathematical solution would be complex, due to the complex nature of the support structures. Data for position information may be obtained via positional feedback sensors or other measuring devices. Using the analytical solutions, would require the solution of complex equations which would be difficult to achieve at the speeds necessary to stabilize a dynamic control system.

Further, even after a mathematical solution was derived, it would not include the unique and repeatable inaccuracies embodied within each individual support structure. The tolerances associated with the positional feedback sensors and the non-linear behavior of the length adjusting members such as hydraulic control systems in each of the hydraulic actuation units would also need to be considered, as well as the tolerances of the mechanical linkages. Each of these unique and repeatable inaccuracies add to the complexity of the system operation.

Therefore, the present application also defines procedures and systems to systematically determine the operational characteristics of individual support structures to permit accurate positioning control. Such procedures and systems provide highly accurate positioning of the support structures even when the support structures and control system are designed with inexpensive components having significant amounts of inaccuracies and/or tolerance variations.

A particular embodiment uses a model-based design approach to systematically determine optimal calibrations for positioning of the support structures.

This model-based calibration design is used in conjunction with a Design Of Experiments (DOE) methodology process to obtain high-quality models of measured data while minimizing testing resources. The resultant models are included in a high-speed control system to accurately position the distributed support structures, such as those used as welding fixtures.

Figure 6:
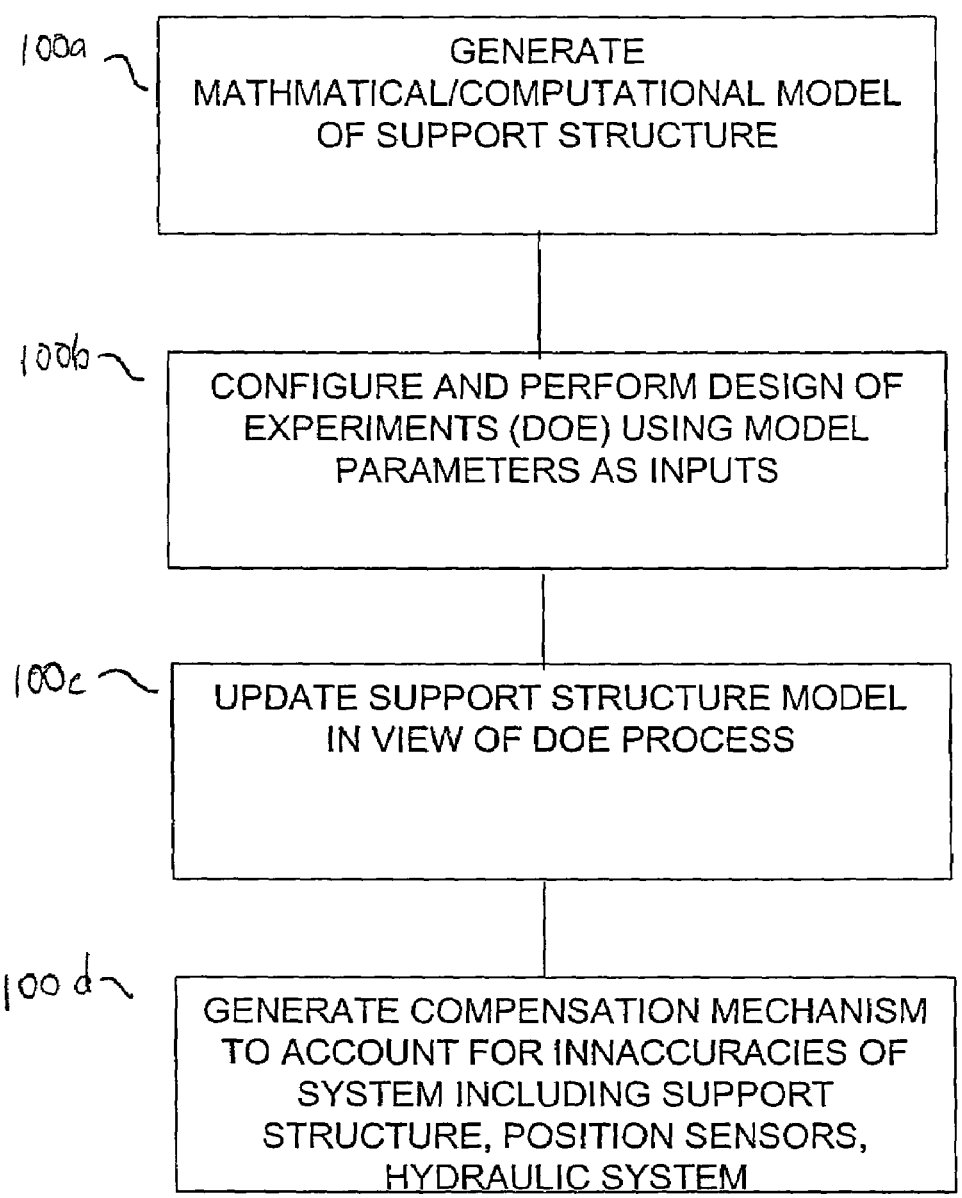
FIG. 6 is a high-level overview for the development of data for the control system according to the present application.

FIG. 6 is a high level flow chart 100 illustrating the above-noted design. Particularly, in step 100a, a mathematical/computational model of a support structure is developed. Information or data from the modeled support structure is used to populate a Design Of Experiments (DOE) model 100b where input variables are structure positional variables and output variables are control element positional parameters. Following the Design Of Experiments process, generated and refined data points (such as position offset values of the support structure) are used to update the support structure model 100c. Thereafter, this refined position data is used in the generation of a compensation mechanism 100d of a controller controlling movement of the support structures to address the aforementioned inaccuracies of the support structure, feedback sensors and non-linear behavior of the hydraulic system.

Figure 7:
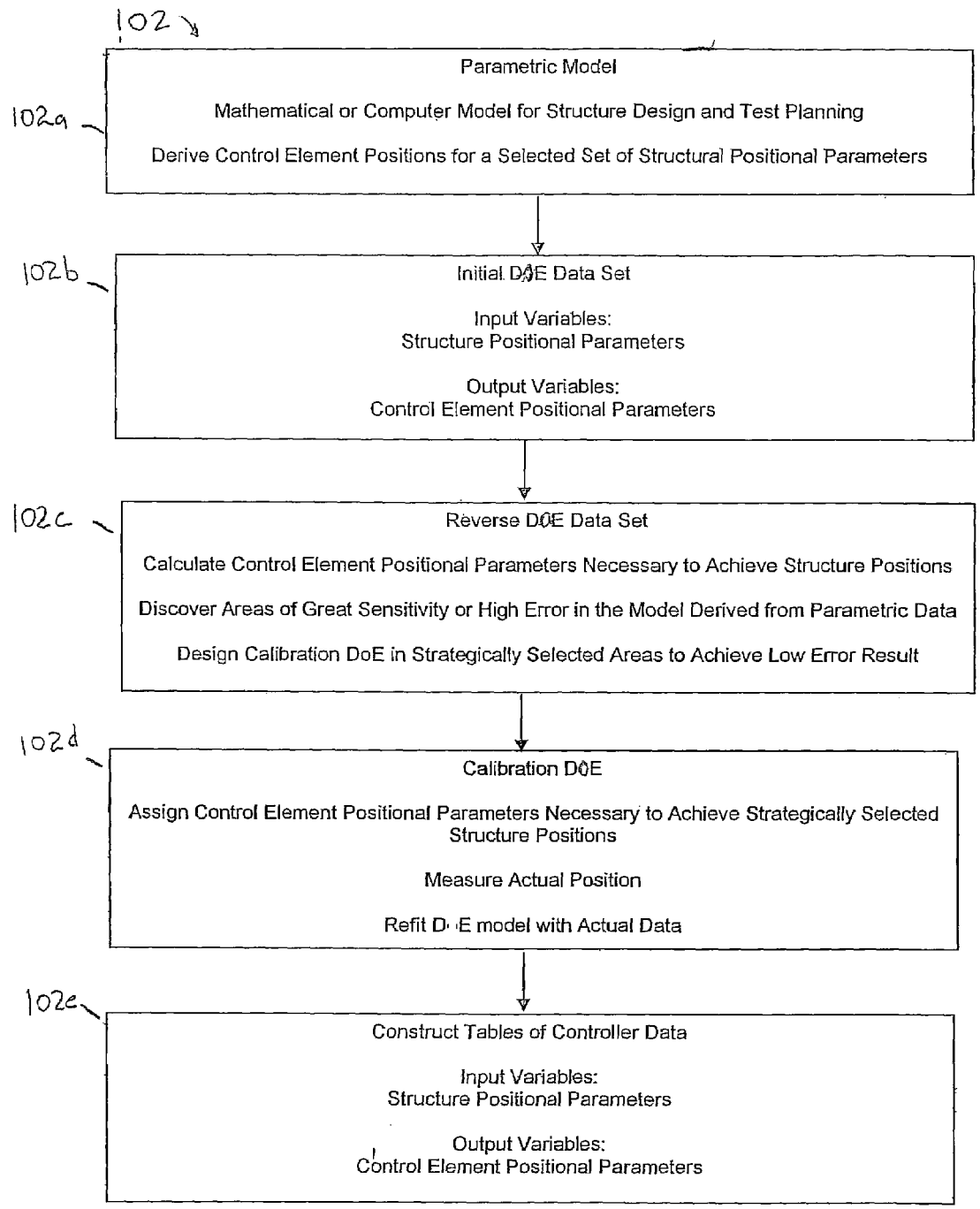
FIG. 7 provides a more detailed flow chart of the system and processes for the present application.

FIG. 7 is a flowchart 102 depicting processes used to generate systems as mentioned above. In step 102a (similar to step 100a of FIG. 6), a mathematical or computational model of a support structure is designed and tested in accordance with a planned procedure. The model may be a parametric or other appropriate model, and from this testing, an initial set of control element positions for a selected set of structural positional parameters are derived 102b.

The procedure to generate highly precise positioning of a support structure, which is configured of components having inherent inaccuracies, includes planning the physical testing to be completed on the actual support structure. This may be done using either mathematical models or data generated by computational models of the ideal structure, such as parametric computer models. Parametric models are a common computer-aided design features that permit a model of the support structure to be "moved" through a range of motion, and are undertaken as part of a design phase to optimize the mechanical parameters for the support structure, or as a method to analyze a given structure.

In one embodiment, each of the components (i.e., elements) comprising the support structure (10) are computer modeled. The individual models of the components are defined mathematically, including their relationship to other components and physical constraints, such as the maximum and minimum lengths (e.g., length adjusting members 50, 52, 60) and angles (e.g., 2-bar linkages 30, 32) for components having freedom to change in length or pivot relative to adjacent components.

As the support structure model is "moved" through a range of motion, the computational models of the components are interactively solved to discover the necessary position and length of each component within the structure, to achieve the desired position of the support structure. In addition to position, velocity, acceleration, applied force and other variables may be calculated for the support structure.

The parametric modeling employs component parameters to control the dimensions and shape of the computer generated support structure model, such as CAD models. In this process a CAD user may adjust model dimensions, to explore the effects of different feature sizes, without recreating the model geometry. The parametric modeling of the support structure will utilize several different types of primitive elements, including dimensions, datums and constraints. Dimension, for example, may be linear and angular. Datums may be defined somewhat differently by specific CAD systems, but commonly datum planes and datum coordinate systems are provided, as well as datum lines and points. Generally, datums are coordinate systems or parts of coordinate systems that are used to control other coordinate systems or geometric entities. Constraints can be geometric or algebraic relationships that the designer imposes on the geometry of the CAD models. For example, typical geometric constraints are parallel, perpendicular, offset, tangent and alignments. These constraints can be applied to the geometric entities, such as lines, planes and surfaces which make up the support structure model. Alignments are used to constrain components (elements) relative to one another when constructing the support structure models. Algebraic constraints are equations that a designer adds to ensure sizes of the features meet the design requirements.

By laying out datums and geometry, and then constraining them with dimensions and constraints of the desired support structure design, a model is constructed that permits the exploration of a range of movement of the support structure.

Figure 8:
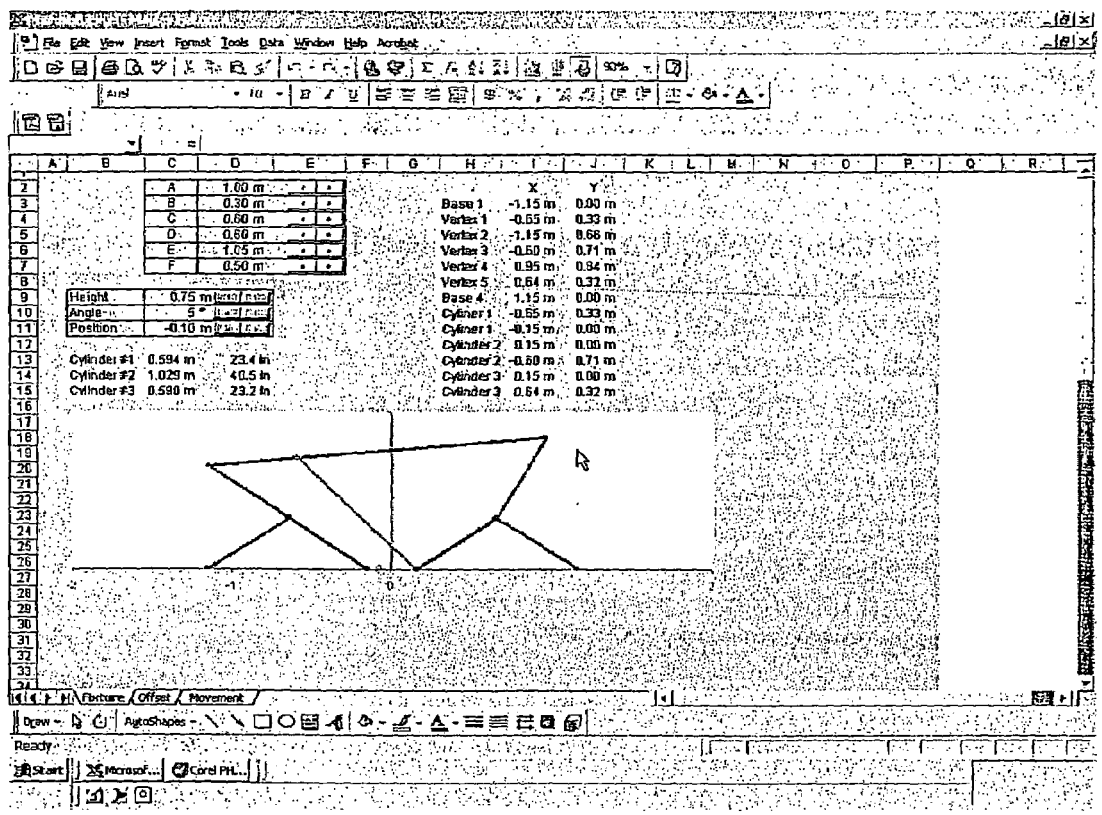
FIG. 8 depicts a display screen showing a parametric designed model.
Figure 9:
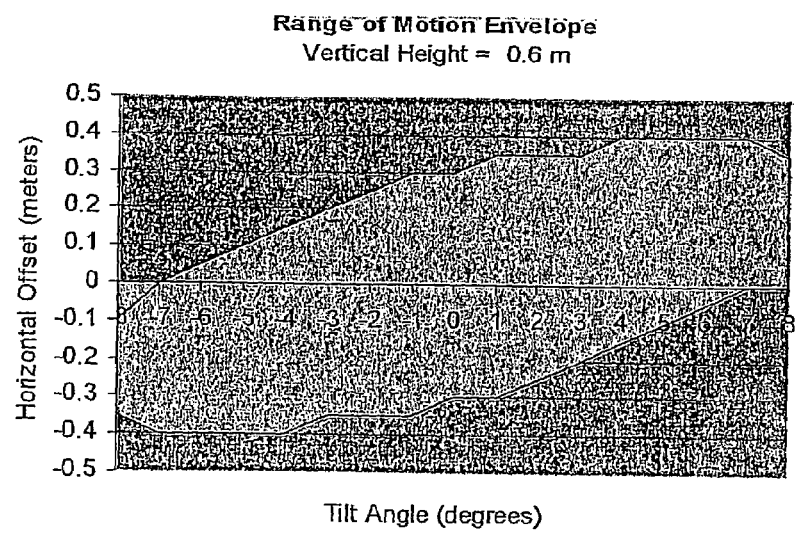
FIG. 9 shows a range-of-motion envelope for a support structure of the present application.

A number of commercially available software programs are capable of parametric modeling. For example, FIG. 8 demonstrates a support structure model generated by a computer-aided design package Solid Edge produced by Unigraphics Corp. and by a spreadsheet program, Excel, using Visual Basic, produced by MicroSoft Corporation. FIG. 9 illustrates a range of motion envelope for one such structure. Other modeling software programs include SolidWorks® and Pro/ENGINEER®. The parametric support structure model is therefore also used to assure that the support structure can achieve the range of motion required for a particular application.

An additional software program by the name Autodesk Inventor, supports the parametric design methodology and is described as being designed to also employ an "adaptive technology" in the modeling of elements or components into a system. Adaptive technology is described as providing a simplified manner in which to create part relationships without depending exclusively on complex mathematics, equations, or dimensions. Using the software with adaptive technology, a user is instructed to simply specify how parts fit together, and an assembly-based "fit" definition of the software automatically determines the size and positions required. This capability is considered to permit assemblies which the user may easily define part size and shape in the assembly context without creating any unexpected assembly relationships. The Autodesk Inventor is also intended to eliminate the need for obtaining parameters between parts, or using variables in equations to define part size, shape and position.

Thus, there are a number of software modeling programs which may be employed by one of ordinary skill in the art to create a dynamic model of the adjustable support structure 10 of FIG. 1, as well as alternative embodiments of the structure.

Next, in step 102b, a Design Of Experiments (DOE) process is populated with input variables (such as structural positional parameters from the support structure model), to obtain output variables, such as control element positional parameters. Thus, the DOE initially inputs an intended position of the support structure, such as the position in the x-direction, the z-direction or the x-z plane at which a movable upper platform (18) of support structure (10) is intended to be located, whereas the output variables identify the positions of the individual control elements or components, such as length adjusting members (50, 52, 60).

As mentioned, the data from the support structure model is used to populate a Design Of Experiments (DOE) process, where DOE is a design methodology process that reduces the number of empirical measurements necessary to characterize a system. DOE is a well-known technique in experimental design field, and utilizes statistical theory to achieve data reduction in order to reduce the number of experiments needed to optimize a system. DOE software tools that guide the experimentation and analysis processes are commercially available, such as from IMAS, Ltd., Manugistics, Inc., SAS Institute, Inc. and StatSoft, Inc., among others.

The DOE process in step 102b assumes a set of input variables and output variables. The method requires a specific set of input variables to be applied to the experimental system. The resultant output variables are measured and entered into the DOE process model. In the process, a "response surface" is generated that represents the relationship between the input and output variables. Known statistical methods are then used to determine the accuracy of the model, including determining where the additional data should be generated to optimize the model. The DOE model may be refined over several iterations to achieve the required accuracy. Once complete, and as noted above, the process moves to step 102c, where the DOE model is "reversed" to generate the set of input variables required to achieve a given output condition, here again this testing is used to locate and/or discover areas of great sensitivity and/or high error in the support structure model.

Among the statistical methods or strategies which may be employed in the DOE process model are the Box-Behnken, Central Composite, Optimal Designs, Space-Filling Designs (i.e., Latin Hypercube) or other methods or strategies as known in the art. The number of factors, the amount of sampling for each factor (levels), and other issues determine which design is used to construct the DOE test sequence for a particular support structure.

It is to be appreciated that combinations of individual component positions (i.e., length adjusting members 50, 52, 60, 2-bar linkages 30, 32) may be mutually exclusive because it is physically impossible to achieve an intended physical configuration of the structure or constraints applied to one or more of the control elements. Therefore the input variables of the DOE model are assumed to be the position parameters of the support structure and the output variables are assumed to be the positions of the individual control elements. Again, other parameters such as velocity, acceleration, applied force, etc. may be modeled.

The DOE process model, populated with data representing the position of each control element relative to the configuration of the structure, is typically arranged to include the extreme ranges of motion of the structure as well as strategically selected center points within the range of motion. Additional data for optimization is typically generated in areas of high sensitivity as indicated by the gradient of the response surfaces.

In addition, once models have been built, they can be used in many ways to enhance the design process. For example, the data may be used to discover structural changes to increase the range of motion, remove areas of high sensitivity or map mutually exclusive command parameters. Additionally, the motion control system (e.g., 78 of FIG. 3) can be designed using the model data by planning the motion as a trajectory of incremental moves across the response surfaces to smooth the motion and eliminate mutually exclusive commands to the control elements.

In step 102d, calibration of the DOE is undertaken and includes assigning control element position parameters which are necessary to achieve the strategically selected structure positions, measuring the actual positions, and thereafter re-fitting the DOE model, taking into consideration the actual data. In step 149, the data obtained in the calibration process step 148 are used within a compensation mechanism, to generate corrected controller data, which in turn is used by the controller in the positioning of the support structures.

With additional attention to step 102d of FIG. 7, which conducts a calibration DOE based on data gathered from the actual support structure to be calibrated, the input variables are chosen to produce structural positions near the strategic points discovered in the initial DOE conducted using data from the parametric computer models. The control system is commanded to achieve each of the input variable conditions in a random order as specified by the calibration DOE test sequence. The output variables are then used for the actual position parameters of the structure including all of the unique inaccuracies that are embedded within the structural elements and the dynamic control system.

Once the system has been characterized, the calibration DOE may be designed to limit the number of tests necessary to calibrate the structure to a given level of accuracy. This reduces the burden of calibrating the structure on a periodic basis or after an event that requires maintenance.

Step 102e uses the calibration DOE process to optimally fill multi-dimensional lookup tables used by or as part of a compensation mechanism implemented by the control system. Particularly, cells in lookup tables are the response surfaces tabulated in a numerical format. The model can be used to generate table data to a given resolution and interpolation is used to estimate parameters for high resolution.

Figure 10A:
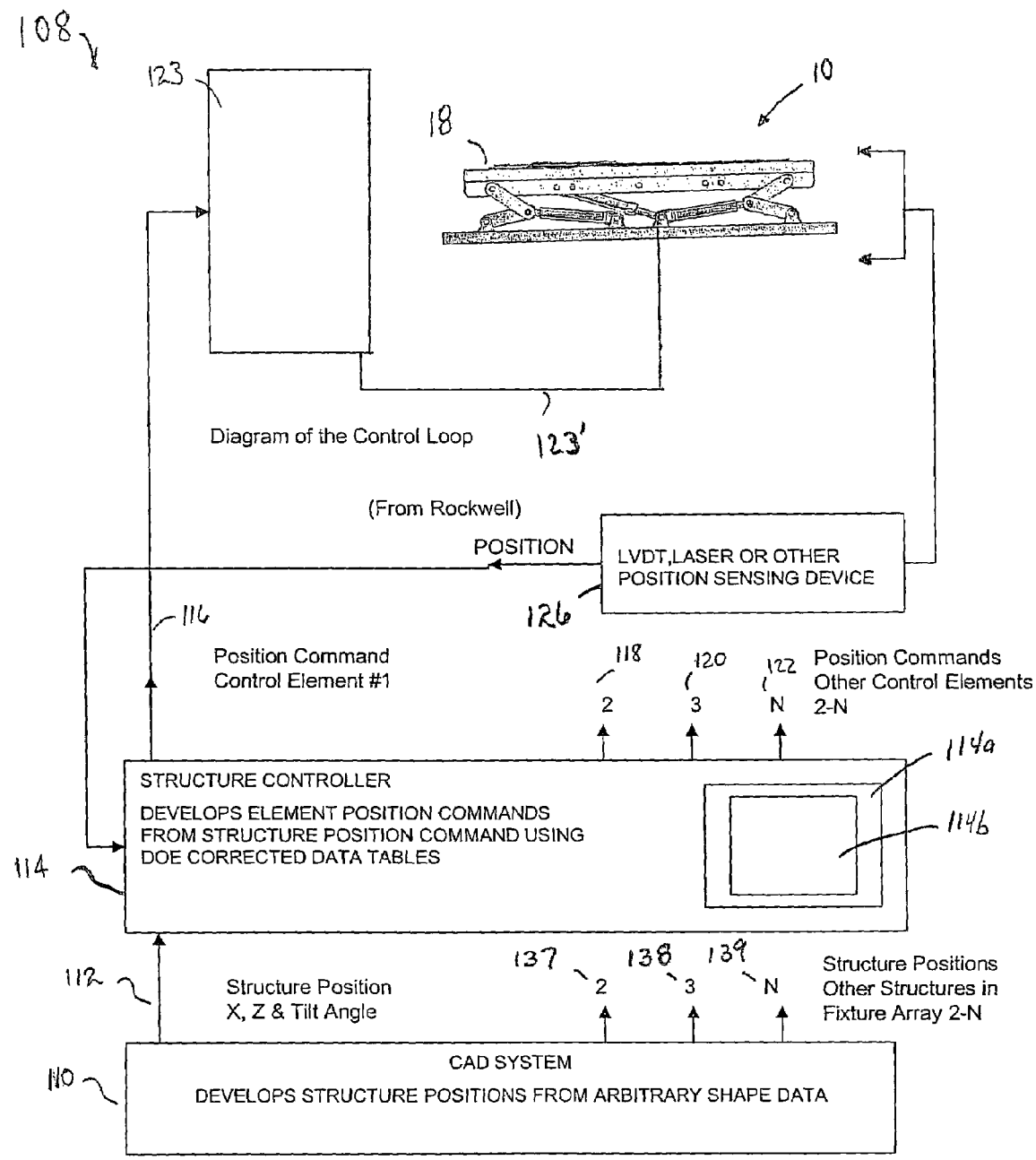
FIG. 10A is a block diagram of a system and process for obtaining the control data in accordance with the present application, where data is obtained from the hydraulic cylinder rod.

Turning to FIG. 10A, set forth is a block system diagram illustrating a first embodiment of a system 108 to control movement of a support structure, through the use of a compensation mechanism to improve system accuracy. In this embodiment, the position of the movable upper platform 18 of support structure is used to determine position error as opposed to determining error positions of individual elements of the support structure, as will be described in FIG. 10B.

As previously mentioned, a mathematical/computational model of the support structure is developed such as by CAD system block 110, where the support structure model is moved through a series of arbitrary positions to obtain data points for use in the refinement of position control. Support structure position signals 112, provide CAD based model structure position data for the movable platform 18 of the support structure 10 which represents a position in the x-direction, z-direction and/or x-z planes. This signal is passed to a structure controller block 114, which generates element position commands from the structure position signals 112, using the DOE corrected data. This corrected data is, in one embodiment, employed as part of a compensation mechanism 114a where corrected data may be held in data tables 114b of structure controller block 114. Position command lines 116, 118, 120, 122 are provided to carry element position command signals to control operation of the control elements, such as one of the length adjusting members (50, 52, 60) of the support structure 10, where the command signals (e.g., line 116) are supplied to a position controller 123, which in turn provides an output 123' to one of length adjusting members 50, 52, 60. In this embodiment, controller 123 is shown as a generalized control block, where the input of signal 116 causes an output 123' to control actuation of one of the control elements. It is to be appreciated in this embodiment position command lines 118, 120 may also be provided to controller 123, and control lines (not shown) similar to line 123' are used to control other length adjusting members (e.g., 50, 52, 60).

In this design, a position sensing device 126 is configured to determine the overall position of movable platform 18. Particularly, a laser inferometer may be used to determine the actual position (i.e., orientation) of the upper movable platform, by known position sensing techniques. The detected position information is then provided to structure controller block 114 via line 127 where compensation for the overall structure is obtained within the structural controller. Using this arrangement, the overall error of support structure 10 is obtained, as opposed to errors of the individual components. In one process, the determined error stored in the compensation mechanism is used to adjust the output of the position command signals (e.g., 116). As a simple example, if based on a non-compensated position command, the movable platform 18 is intended to be positioned 25 inches from the fixed base 28. However, the DOE process has previously determined that the actual position of the movable upper platform is actually located based on this command 26 inches from the base. Thus, an error of approximately 0.04 percent exists. This information is provided in the compensation mechanism to refine the output signals. Thus, when a signal to control movement of the actuators is generated (for example via line 116), it is compensated based on the compensation mechanism generating a more accurate positioning of the structure. It is to be understood the above is only a simple example and a variety of other error compensation values will be incorporated within the tables.

It is also to be understood that the compensation mechanism is useful for situations where the position feedback information is not highly accurate. Particularly, the preset concepts take into consideration that the position sensor itself may not be accurate, but the inaccuracies are repeatable as are the other inaccuracies of the system. Under this situation it is possible to build a highly accurate compensation mechanism for the feedback as well as the other repeatable inaccuracies.

Figure 10B:
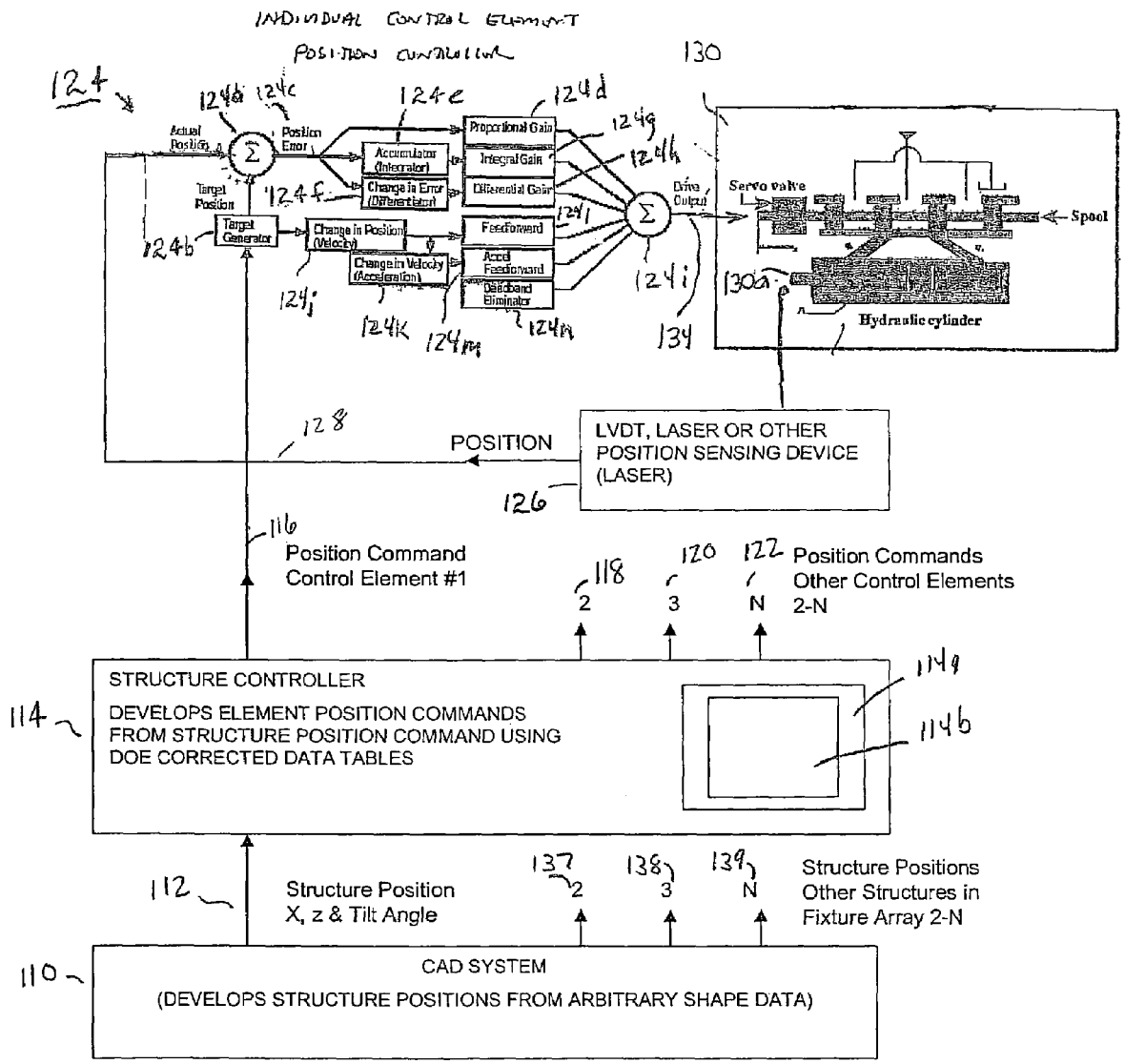
FIG. 10B illustrates a processing control block diagram substantially similar to FIG. 10A, but where the position sensing device obtains position information from the movable platform of the support structure.

Also by the design of FIG. 10A, in place of multiple position sensing devices which will be needed for each hydraulic cylinder of the system in FIG. 10B, a single position sensing device may be used.

FIG. 10B provides an alternative embodiment where individual actuator/cylinder movement is measured and compensated. Thus, the second embodiment compensates on the cylinder level, where each cylinder may be tested one at a time for error. For example, the cylinder could be measured with an LVDT and then with a laser. The difference may then be conducted between the two measurements to determine the error. This determined error may be input for the compensation tables may.

In this embodiment of FIG. 10B, a CAD structure is developed in block 110, and element position commands are developed using DOE corrected tables developed during DOE processes. Position command signals 116 are passed to position controller 124, and more particularly to summing node 124a via target generator 124b, which generates target position information. Position sensing device 126 acquires actual position data which is supplied to summing node 124a. The position sensing device 126 is configured to sense movement of rod 130a of hydraulic cylinder system 130 and to provide this actual position information via signal 128 to summing node 124a. A position error output signal 124c is generated for use by the rest of the position controller 124 to generate drive output signal 134.

It is to be understood that position controller 124 of FIG. 10B may be a known controller such as may be acquired from a number of sources, e.g., such as Rockwell International. The position command signal 116, as well as the actual position signal 128 from position sensing device 126, are processed within position controller 124 to produce an output drive signal 134. Particularly in this embodiment, position command signal 116 is provided to a target generator 124b for the generation of a target position, which is passed to summing node 124a. Error position signal 124c, is passed directly to proportional gain block 124d, as well as accumulator (integrator) block 124e and change in error (differentiator) block 124f, which in turn provide signals to integral gain block 124g and differential gain block 124h. Each of these blocks in turn feed into summation node 124i. The target generator block 124b provides an output to a change in position (velocity) block 124j, which supplies change in velocity (acceleration) block 124k. Feed-forward block 124l receives input from the change in position block 124j, and acceleration feed-forward block 124m receives its input from the change in velocity (acceleration) block 124k. These blocks (i.e., feed-forward block 124l and acceleration feed-forward block 124m), along with deadband eliminator block 124n, also pass their output to summation node 124i to obtain drive output signal 134, which is used to control operation of hydraulic system 130.

It is noted that FIGS. 10B and 10A illustrate that the support structure model developed in CAD system block 110 may be used in the operation of other support structures. Particularly, lines 137, 138, 139 pass model structure position information (ie., x, z and x-z tilt angle) to other structure controllers, such as those which may be in an adjustable support structure array.

The present processes and systems of FIGS. 10A and 10B take advantage of the control elements, such as the length adjusting members 50, 52 and 60 having repeatable characteristic errors (i.e., inaccuracies), as well as repeatable errors in the position sensing devices, used by compensation mechanism 114a in the structure controller block 114 to compensate for the errors, either as overall system errors or errors of individual components.

Thus, the embodiment of FIG. 10A measures the overall system error and generates compensation within the structural controller 114, as opposed to obtaining the error of each cylinder, such as in the embodiment of FIG. 10B.

Using the embodiment of FIG. 10A, controller 123 may not require individual cylinder compensation concepts of the embodiment in FIG. 10B. Thus, in the embodiment of FIG. 10A, there may be a sloppy cylinder movement, but since the overall system compensation error is being detected, these errors are addressed in the DOE processes in the structural controller 114.

It is to be appreciated, that the embodiments of FIGS. 10A and 10B may be combined within a single system. In such a design, the individual cylinder coordinate system movements would need to be transposed into an overall joint system coordinate.

With continuing attention to FIGS. 10A and 10B, the actual position sensing device or system may be implemented during an initial calibration of the support structures system, and thereafter removed during normal operation. Alternatively, the position sensing device may be incorporated within the system, such that periodic recalibration may be undertaken in situ.

The above-described processes and systems are also useful to address potential non-linear movement of the support structures in consideration of the design of the support structures, including the use of the 2-bar linkages. Particularly, the 2-bar linkages provide the potential for a non-linear movement based on the amount of force applied by the length adjusting members at different angles. As an example, when a 2-bar linkage is at an angle of 125°, application of a first pressure might move the 2-bar linkage to a second angle of approximately 100° (a 25° change). However, if that same amount of pressure were applied when the angle was at 80°, it might move the same 2-bar linkage to a 50° position (a 30° change). Thus, the 2-bar linkages, as well as other hinge arrangements, can have a non-linear sensitivity to applied pressure. The DOE process addresses high sensitivity areas, which respond in a non-linear manner, by obtaining additional test data focused at these areas to achieve a precise, accurate overall positioning system.

Figure 11:
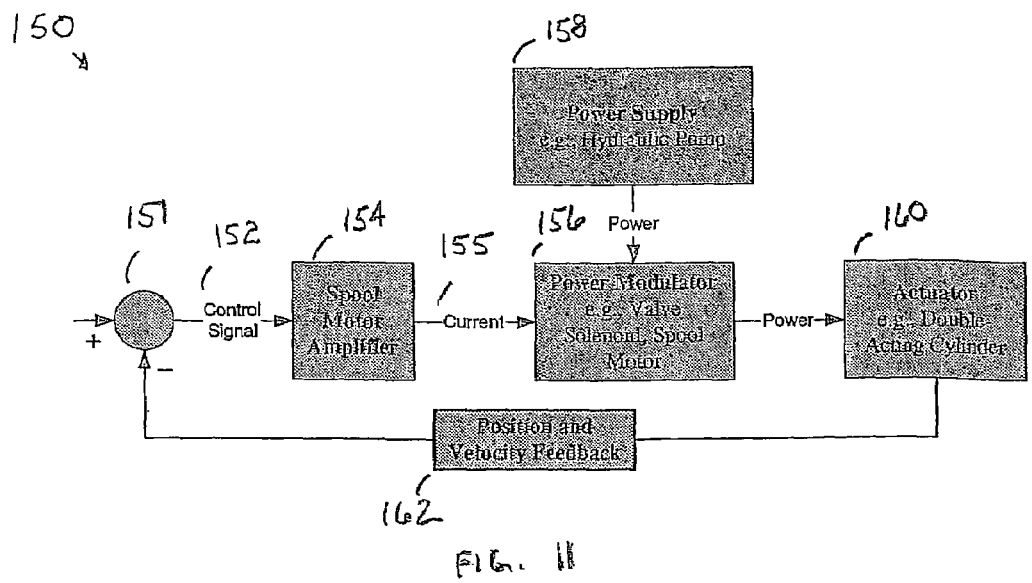
FIG. 11 is a block diagram for a hydraulic actuation system, which may be used in the present application.

Turning now more particularly to actuation of the support structures, which in one embodiment are actuated by hydraulic cylinders, attention is directed to the hydraulic control block diagram 150 of FIG. 11. It is to be appreciated this block diagram represents the general operational aspects of a hydraulic system such as hydraulic system 130 of FIGS. 10A and 10B. A summing node 151 outputs control signal 152 which is supplied to a spool motor amplifier 154. The amplifier generates an amplified current 153 for power modulator 156, which may be a valve solenoid, spool motor or other appropriate power modulating device. Power modulator 156 is powered by power supply 158, for example a hydraulic pump, or other known power sources. The output of power modulator 156 provides power to actuator 160, such as a double-acting hydraulic cylinder or other hydraulic position adjusting device. Output from the actuator 160 is provided to a position and velocity feedback block 162 whose output is supplied to summing node 151 to adjust control signal 152. It is to be appreciated that summing node 151 is provided as a composite component which would have certain characteristics of nodes 124a, 124i of FIGS. 10A, 10B, where for instance the input of feedback 162 would go to summing node 124a and the output signal 152 would be delivered from summing node 124i.

Electrohydraulic servo devices and systems such as system 118 of FIGS. 10A, 10B work on the principle of hydraulic amplification with an electromagnetically operated armature. This armature controls the movement of a small spool in the hydraulic amplifier control orifices (ports). This, in turn, controls the power modulation which in turn is then passed to the actuator.

As illustrated by graph 170 of FIG. 11, in most cases the relationship between the control signal 172 applied to the power modulator and the actual fluid velocity 174 is not as linear, as represented by ideal system response curve 176. Rather, as shown by actual response curve 178, a deadband 179 exists around a zero velocity due to the mechanical characteristic of such devices. In order to prevent fluid pressure loss, hydraulic cylinders are often designed to require a small amount of valve movement before any fluid movement occurs.

Figure 12:
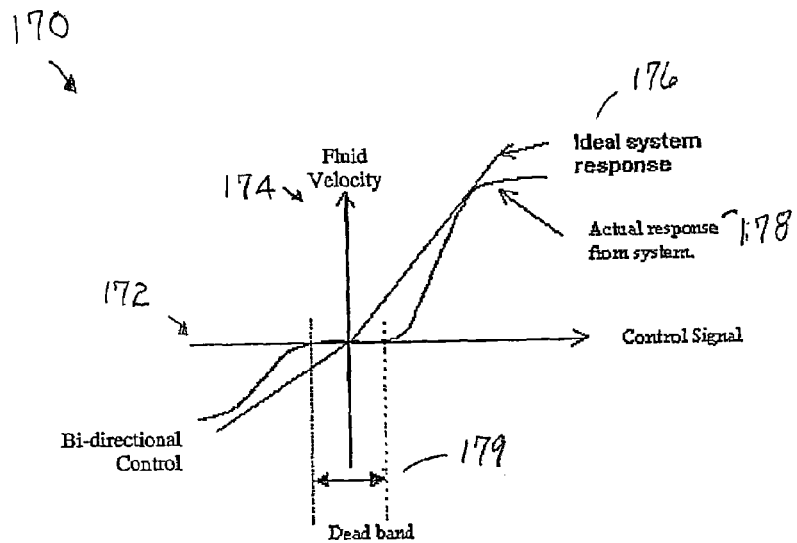
FIG. 12 provides a comparison between an ideal linear response and a hydraulic actuation system, and a common actual response from a non-linearized system.
Figure 13:
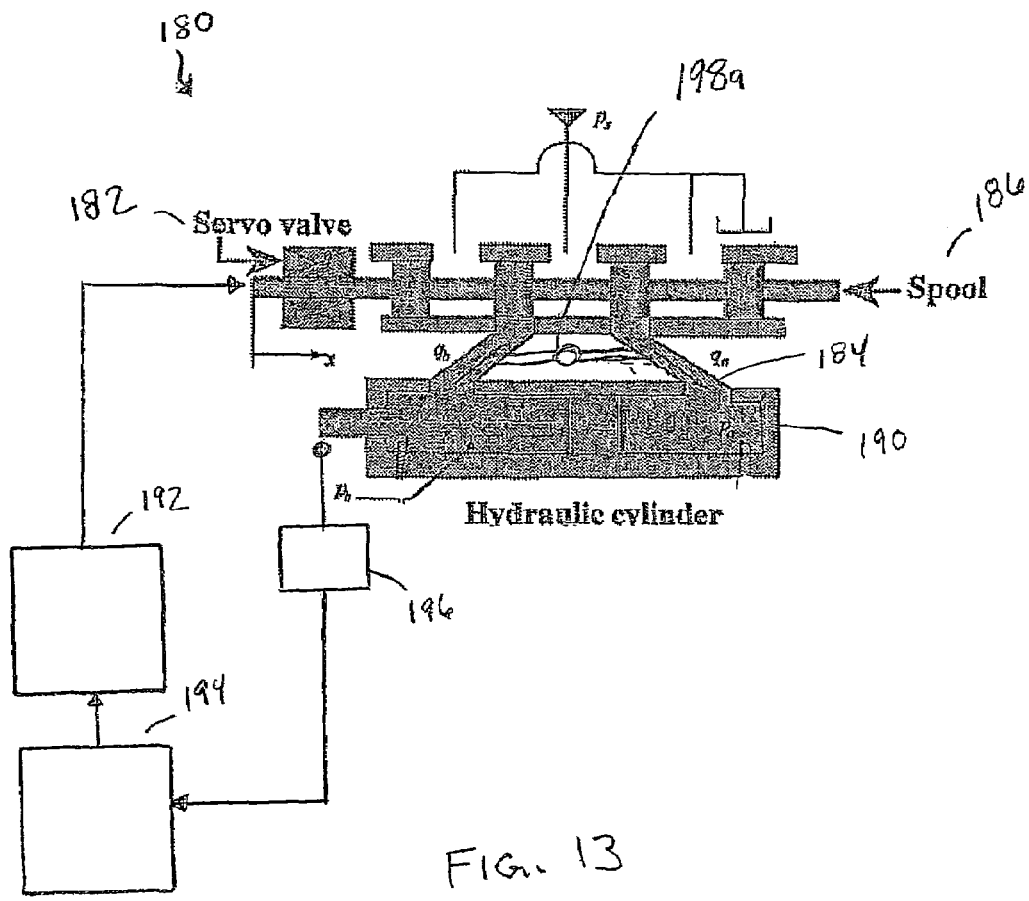
FIG. 13 shows a hydraulic actuation system which permits for increased linearity of operation.

In the schematic diagram of an electro-hydraulic servo system 180 of FIG. 13, which may be used in the present application, it can be seen how the geometry of the servo valve 182 creates a deadband. The servo valve 182 may cover fluid passage 184 over a small distance. Thus, small movements of spool 186, may not permit fluid flow, resulting in the non-linearity of curve 178 (FIG. 12).

A second factor that affects the linearity of flow rate is the diameter of the cylinder rod 188 (see also rod 130a of FIGS. 10A, 10B). Because rod 188 is only on one side of cylinder 190, the fluid applies force to a reduced cross-sectional area when flowing into the rod side of the cylinder. The result is that for identical flow rates, velocity will be higher when fluid is flowing on the rod side of the cylinder. Another area of non-linear control is at very high control signal values. This can occur because maximum fluid velocity is also limited by fluid viscosity and friction. Thus, for at least the recited reasons, hydraulic control systems can exhibit a high degree of nonlinear behavior.

In industry, servo controlled spool valves are commonly used to achieve bi-directional control of hydraulic systems. Therefore, commercial control systems will often employ linearization techniques to improve the control system response to reflect a more linearized control. One particular implementation to obtain improved linearization, has been proposed by Berkeley Process Control, Inc. In the design set forth by this company, in order to provide an optimization of the control to valve, Berkeley creates a series of linear relationships of control signals to fluid flow velocity. The linearization is performed via an adjustment table that specifies a control signal for a given fluid velocity. This table is generated within firmware from user-supplied data. This permits the user to enter one set of servo gains for the full operation range of a valve. When the final target position of the valve is reached, the adjustment table is ignored to avoid discontinuity in the inflexion points of the table.

A critical factor in implementing this process, is that the controller must receive real-time quadrature feedback of an actuator's position. The common method of implementing this requirement is to utilize an encoder mounted to a pulley as part of a belt and pulley assembly. The belt is rigidly coupled to the actuator. Motion of the actuator back drives the encoder, and the encoder is then connected to the feedback of the axis of control. The control signal must be passed to a device that provides power to the power modulation device, typically a solenoid or spool motor. In most cases, in accordance with the Berkeley process, this device is a panel-mounted amplifier card that will scale the control signal to an appropriate level of current. The device is then selected to insure a repeatable profile of flow rates with respect to the control signal. If the valve manufacturer provides valve characteristic tables indicating flow rate as a function of control signal, each inflection point can be entered into the control table lookup. If this is not possible, the tables should be developed empirically.

The first points that may be developed are the deadband points. This axis should not be under closed loop control. When the axis is in the static position, a small control signal is issued. The small control signal should be increased very slightly until the control signal is sufficient to produce motion. The static friction compensation may be a percentage of the maximum of the control signal required to cause the axis to move steadily for the respective direction. This procedure should be repeated for the reverse direction.

A number of methods may be used to develop addition and points in a curve. Most effective is to perform several open loop control commands. Open loop commands for small intervals in both the positive and negative direction can be issued with axis position and velocity information recorded. From this information, velocity can be calculated at several areas of servo control. Ideally, data may be taken at each whole voltage of the small control signal, both positive and negative. However, points can be estimated or interpolated from the readings that are available.

As an alternative to, or to be used in conjunction with the Berkeley teachings, discussed below is an implementation of a force-based positional control strategy to increase the linearity of a system for the present application. In this method, a first "inner" control loop 192 is used to regulate the differential pressure on the hydraulic cylinder at relatively high speed. A second "outer" control loop 194 issues commands to the differential (i.e., first) pressure control loop to regulate the cylinder position based on a positional feedback device (e.g., 126 FIGS. 10A, 10B; 162 FIG. 11). This method compensates for some of the nonlinear behavior associated with the spool valve and fluid dynamics. However, the nonlinear nature of the hydraulic cylinder remains, since the fluid applies a force to a reduced cross-sectional area on the rod side of the cylinder, which introduces an offset in the fluid pressures required to produce an equal force in either direction.

Further improvement of linearity and stability may be made at the expense of fluid pressure loss by providing a small bypass path 198 directly around the hydraulic cylinder 190. This forces the servo control valve to operate within the linear region on one side of the deadband. If the bypass path 196 is very small in comparison to the cylinder diameter, the pressure loss may be neglected.

Electrically controlled hydraulic actuators can generate high forces, exhibit rapid responses and have a high power to weight ratio when compared to electrical alternatives.

Figure 14:
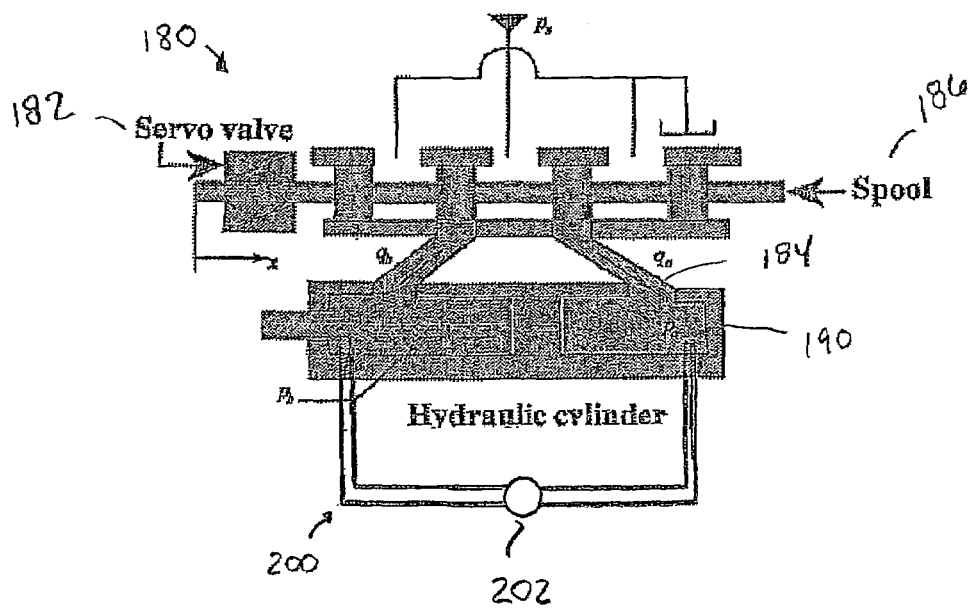
FIG. 14 depicts a venting/bypass arrangement to address overload situations.

In the distributed support structure application such as shown in FIG. 3, the large applied loads are intended to be distributed over the entire support structure array. However, should one support structure within the array be positioned improperly, it is possible that the support structure will bear a disproportionate amount of the load. As shown in FIG. 14, the hydraulic system of the present application is, in one embodiment, designed with a vent or bypass circuit 200 to vent or bypass excessive pressure in the hydraulic system causing the structure to adapt to the overload by sagging as required to remove excess pressure. The venting circuit 200 includes a venting mechanism 202, includes an absolute pressure limit, and is designed to bypass the hydraulic control system and pass the hydraulic fluid back to a low-pressure reservoir on the lower pressure side of the cylinder. This particular feature is an advantage that is not possible using electrical servos with ball screw drives, which may also be considered for use in the support structures.

The present application has been described with reference to preferred embodiments. Obviously modifications and alterations will occur to others upon a reading and understanding of the preceding detailed description. It is intended the present claims be construed as including all such modifications and alterations or the equivalents thereof in consideration of the material presented herein.

The invention claimed is:

1. A welding support system comprising:
   a plurality of adjustable welding support structures positioned in relationship to each other to permit welding of a workpiece held by the plurality of adjustable welding support structures, each of the support structures having a support base and a movable platform connected to the support base by spaced apart 2-bar linkages with center pintles, the welding support structures having separate support bases and separate movable platforms; and
   a control system for individually controlling the position of the movable platform for each of the adjustable welding support structures.

2. A welding support system comprising:
   a plurality of adjustable welding support structures positioned in relationship to each other to permit welding of a workpiece held by the plurality of adjustable welding support structures, each of the support structures having a support base and a movable platform connected to the support base by spaced apart 2-bar linkages with center pintles; and
   a control system for individually controlling the position of the movable platform for each of the adjustable welding support structures;
   wherein an orientation of a movable platform of at least one of the adjustable welding support structures is distinct from a movable platform of another one of the adjustable welding support structures of the plurality of adjustable welding support structures.

3. The system according to claim 1, wherein the control system is a hydraulic control system.

4. The system according to claim 3, wherein the hydraulic control system, further includes a linearization mechanism to increase linearity of fluid flow.

5. The system according to claim 3, wherein the hydraulic control system, further includes a pressure release arrangement, wherein when a weight above a determined amount is located on the movable platform, fluid within hydraulic control system is moved from a first area of the system to a second area of the system.

6. The system according to claim 5, wherein the first area of the system is at a higher pressure than the second area.

7. The system according to claim 1, wherein the control system includes a compensation mechanism, configured with compensation data to adjust operation of the control system to account for positioning inaccuracies of the system.

8. The system according to claim 7, wherein the compensation mechanism is configured to adjust for inaccuracies of the position feedback arrangement.

9. The system according to claim 8, wherein the position inaccuracies are based on a sensing of the overall support structure.

10. The system according to claim 8, wherein the position inaccuracies are based on inaccuracies of individual components of the support structure.

11. The system according to claim 1, wherein the control system generates commands to control movement of the support structures, wherein parameters in the commands are based at least in part on a Design Of Experiments process model.

12. The system according to claim 11, wherein the Design Of Experiments process model is configured to receive inputs from computational models of the support structures.

13. The system according to claim 1, wherein the movable platforms have three degrees of freedom.

14. The system according to claim 13, wherein the three degrees of freedom are in the x-direction, the z-direction and the x-z axis.

15. The system according to claim 1, wherein the moving of the support structures is achieved by hydraulic actuation.

16. The system according to claim 1, wherein each of the plurality of adjustable welding support structures further include,
   a series of length adjusting members between the pintles and the support base and a length adjusting member between said movable platform and the support base, wherein the lengths of the length adjusting members set the orientation of the movable platform.

17. A welding support system comprising:
   a plurality of adjustable welding support structures positioned in relationship to each other to permit welding of a workpiece held by the plurality of adjustable welding support structures, each of the support structures having a separate movable platform; and
   a hydraulic control system for individually controlling the position of the movable platform for each of the adjustable welding support structures, the hydraulic control system including a pressure release arrangement, wherein when a weight above a determined amount is located on the movable platform, fluid within hydraulic control system is moved from a first area of the system to a second area of the system.

18. The system according to claim 17, wherein the hydraulic control system further includes a linearization mechanism to increase linearity of fluid flow.

19. The system according to claim 17, wherein the first area of the system is at a higher pressure than the second area.

20. The system according to claim 17, wherein an orientation of a movable platform of at least one of the adjustable welding support structures is distinct from a movable platform of another one of the adjustable welding support structures of the plurality of adjustable welding support structures.

21. The system according to claim 17, wherein the control system includes a compensation mechanism, configured with compensation data to adjust operation of the control system to account for positioning inaccuracies of the system.

22. The system according to claim 17, wherein the movable platforms have three degrees of freedom.

23. The system according to claim 22, wherein the three degrees of freedom are in the x-direction, the z-direction and the x-z axis.

24. A welding support system comprising:
- a plurality of adjustable welding support structures positioned in relationship to each other to permit welding of a workpiece held by the plurality of adjustable welding support structures, each of the support structures having a separate movable platform with three degrees of freedom; and
- a control system for individually controlling the position of the movable platform for each of the adjustable welding support structures, wherein an orientation of a movable platform of at least one of the adjustable welding support structures is distinct from a movable platform of another one of the adjustable welding support structures of the plurality of adjustable welding support structures.

25. The system according to claim 24, wherein the three degrees of freedom are in the x-direction, the z-direction and the x-z axis.

26. The system according to claim 24, wherein the control system is a hydraulic control system including a linearization mechanism to increase linearity of fluid flow.

27. The system according to claim 24, wherein the control system is a hydraulic control system including a pressure release arrangement, wherein when a weight above a determined amount is located on the movable platform, fluid within hydraulic control system is moved from a first area of the system to a second area of the system.

28. The system according to claim 24, wherein the control system includes a compensation mechanism, configured with compensation data to adjust operation of the control system to account for positioning inaccuracies of the system.

29. The system according to claim 28, wherein the compensation mechanism is configured to adjust for inaccuracies of the position feedback arrangement.

* * * * *